United States Patent
Moe et al.

[11] Patent Number: 6,134,406
[45] Date of Patent: Oct. 17, 2000

[54] BELT STEERING MECHANISM FOR USE WITH AN ELECTROPHOTOGRAPHIC IMAGING SYSTEM

[75] Inventors: Riyad E. Moe, Austin, Tex.; Robert E. Brenner, New Richmond, Wis.

[73] Assignee: Minnesota Mining and Manufacturing Company, Saint Paul, Minn.

[21] Appl. No.: 09/266,421

[22] Filed: Mar. 11, 1999

[51] Int. Cl.[7] .................................................. G03G 15/00
[52] U.S. Cl. ............................................ 399/165; 347/116
[58] Field of Search .................................. 399/162, 165; 198/806, 807; 347/116

[56] References Cited

U.S. PATENT DOCUMENTS

| | | |
|---|---|---|
| 4,959,040 | 9/1990 | Gardner et al. . |
| 4,961,089 | 10/1990 | Jamzadeh .................................. 399/165 |
| 5,510,877 | 4/1996 | DeJong et al. ........................ 399/165 X |
| 5,652,282 | 7/1997 | Baker et al. .............................. 523/201 |
| 5,659,851 | 8/1997 | Moe et al. ................................ 399/165 |
| 5,717,984 | 2/1998 | Wong ........................................ 399/165 |
| 5,737,003 | 4/1998 | Moe et al. ................................ 347/116 |
| 5,905,519 | 5/1999 | Brenner, Jr. et al. ................ 399/162 X |

FOREIGN PATENT DOCUMENTS

| | | |
|---|---|---|
| 0 608 124 | 7/1994 | European Pat. Off. . |
| 0 785 480 | 7/1997 | European Pat. Off. . |
| 0 923 002 | 6/1999 | European Pat. Off. . |

*Primary Examiner*—William J. Royer
*Attorney, Agent, or Firm*—William D. Bauer

[57] ABSTRACT

A mechanism for steering a photoconductor belt in an electrophotographic imaging system is disclosed. The photoconductor belt is moved about a support roller system of the imaging system to form a continuous transport path. The photoconductor belt tends to deviate from this continuous transport path in a direction substantially perpendicular to the path. The belt steering mechanism includes a support carriage, a steering carriage, a support roller and a belt steering drive assembly. The steering roller is mounted to the steering carriage, and the steering carriage is connected to the support carriage so as to be pivotable about a steering axis. The belt steering drive assembly is operably coupled to the steering carriage to pivotally move the steering carriage about the steering axis. Upon pivotal movement of the steering carriage about the steering axis, the steering roller pivots therewith to move the photoconductor belt in a direction substantially perpendicular to the continuous transport path to reduce deviation of the photoconductor belt from the path.

38 Claims, 8 Drawing Sheets

BELT STEERING MECHANISM FOR USE WITH AN ELECTROPHOTOGRAPHIC IMAGING SYSTEM

TECHNICAL FIELD

This invention relates to photoconductor belts used in electrophotographic imaging systems. In particular, the present invention is a belt steering mechanism for moving a photoconductor belt in a direction perpendicular to a continuous transport path of the belt about a support roller mechanism of an electrophotographic imaging system. The belt steering mechanism moves the photoconductor belt to correct transport path deviation of the belt from a desired, centered, continuous transport belt path about the imaging system support roller mechanism.

BACKGROUND OF THE INVENTION

Throughout the business world, multi-color electrophotographic (EP) imaging systems are extensively used for image reproduction. To effect image reproduction, one type of multi-color electrophotographic imaging system employs a photoconductor, such as an endless belt having an organic photoreceptor coating thereon. In this type of multi-color electrophotographic imaging system, latent images, representative of a plurality of different color separation images, are formed in an imaging region of the moving photoconductor belt. The color separation images together define an overall multi-color image. The color separation images may define, for example, yellow, magenta, cyan, and black components that, upon subtractive combination on output media, produce a visible representation of the multi-color image. Prior to an imaging cycle, a uniform charge is applied to the organic photoreceptor coating of the endless belt. Each of the latent images, defining the color separation images, is formed by scanning a modulated laser beam across the moving photoconductor belt to selectively discharge the organic photoreceptor coating of the belt in an image-wise pattern. Appropriately colored developers are applied to the organic photoreceptor coating of the belt after each latent image is formed to develop the latent images. The resulting color separation images ultimately are transferred to the output media to form the finished multi-color image.

In some multi-color electrophotographic imaging systems, the latent images are formed and developed on top of one another in a common imaging region of the photoconductor belt. The latent images can be formed and developed in multiple passes of the photoconductor belt around a continuous transport path. Preferably, the latent images are formed and developed in a single pass of the photoconductor belt around the continuos transport path, because a single pass system enables multi-color images to be assembled at extremely high speeds.

An example of an electrophotographic imaging system configured to assemble a multi-color image in a single pass of a photoconductor belt is disclosed in copending and commonly assigned U.S. patent application Ser. No. 08/537,296 to Kellie et al., filed Sep. 29, 1995, and entitled "METHOD AND APPARATUS FOR PRODUCING A MULTI-COLORED IMAGE IN AN ELECTROPHOTOGRAPHIC SYSTEM".

In an electrophotographic imaging system as described above, the latent images must be formed in precise registration with one another to produce a high quality image. In imaging systems incorporating an endless photoconductor belt, precise registration can be difficult due to deviation of the photoconductor belt from its centered, continuous transport path in a direction perpendicular to the transport path. Specifically, the endless photoconductor belt can undergo side-to-side movement during travel (i.e., conventionally referred to as "belt walking"). The imaging region in which the latent images are formed is fixed relative to the edge of the photoconductor belt. In addition, the scanning beam used to form each latent image in the imaging region is fixed relative to a start-of-scan coordinate. The side-to-side movement of the photoconductor belt can cause movement of the imaging region relative to the start-of-scan coordinate. As a result, misregistration can occur between different scan lines and between different latent images. This misregistration can significantly degrade image quality. In particular, this misregistration can produce visible artifacts in the final multi-color image upon transfer of the misregistered color separation images to the output media.

To eliminate this misregistration, multi-color electrophotographic imaging systems typically employ a registration system that includes a belt steering mechanism. The belt steering mechanism moves the endless photoconductor belt to correct for deviation (i.e., side-to-side movement) of the belt from a desired, centered, continuous transport belt path. The belt steering mechanism generally corrects the side-to-side movement of the endless photoconductor belt by continuously realigning the moving belt to its desired, centered, continuous transport belt path. Prior belt steering mechanisms often have proven to be ineffective, cost-prohibitive, space-prohibitive, or a combination thereof. Typically, these prior belt steering mechanisms have been of complex designs employing a large number of system components. As a result of this design complexity and the large number of system components, the overall reliability of these prior belt steering mechanisms, and thereby the reliability of the multi-color electrophotographic imaging systems employing these prior belt steering mechanisms, has been undesirably diminished.

There is a need for an improved belt steering mechanism for a registration system of a multi-color electrophotographic imaging system. In particular, there is a need for a belt steering mechanism that moves the endless organic photoconductor belt of the imaging system to correct for deviation (i.e., side-to-side movement) of the belt from a desired, centered, continuous transport belt path. By continuously realigning the moving belt to its desired, centered, continuous transport belt path, the belt steering mechanism significantly improves image quality by substantially eliminating misregistration between different scan lines and different latent images that can produce visible artifacts in the final multi-color image on the output media. In addition, the belt steering mechanism should provide these features while being of a reliable, non-complex design so as to be relatively easy and inexpensive to manufacture.

SUMMARY OF THE INVENTION

The present invention is a mechanism for steering a photoconductor belt in an electrophotographic imaging system. The photoconductor belt is moved in a first direction about a support roller system of the imaging system to form a continuous transport path. The photoconductor belt tends to deviate from this continuous transport path in a second direction substantially perpendicular to the continuous transport path. The belt steering mechanism operates to reduce (i.e., correct) this deviation of the photoconductor belt from the continuous transport path.

The belt steering mechanism includes a support carriage and a steering carriage having first and second opposite ends. The steering carriage is pivotally mounted to the support carriage about a steering axis of a steering shaft. The belt steering mechanism also includes a steering roller which is mounted to the steering carriage so as to be pivotable therewith about the steering axis. The steering roller contacts an inner surface of the photoconductor belt and has a longitudinal axis that is substantially perpendicular to the steering axis. The belt steering mechanism further includes a belt steering drive assembly operably coupled to the steering carriage to pivotally move the steering carriage about the steering axis. Upon pivotal movement of the steering carriage about the steering axis, the steering roller pivots therewith to move the photoconductor belt in the second direction to reduce deviation of the photoconductor belt from the continuous transport path.

In a first preferred embodiment, the belt steering drive assembly of the belt steering mechanism includes a belt steering motor having a rotatable output shaft, a drive link mounted to the output shaft and a drive pin mounted to the first end of the steering carriage. The drive link has a longitudinally extending slot that freely receives the drive pin, such that, upon operation of the belt steering motor, the steering carriage is pivotally moved about the steering axis through the drive pin and drive link interengagement.

In a second embodiment, the belt steering drive assembly of the belt steering mechanism includes a belt steering motor having a rotatable output shaft, a drive link mounted to the output shaft and a drive pin mounted to the first end of the steering carriage. The drive link has a curved slot that has a non-constant radius of curvature. The curved slot freely receives the drive pin, such that, upon operation of the belt steering motor, the steering carriage is pivotally moved about the steering axis through the drive pin and drive link interengagement.

In a third embodiment, the belt steering drive assembly of the belt steering mechanism includes a belt steering motor having a rotatable output shaft. The output shaft of the belt steering motor is directly connected to a free end of the steering shaft, such that, rotation of the belt steering motor output shaft causes rotation of the steering shaft and pivotal movement of the steering carriage about the steering axis.

In a fourth embodiment, the belt steering drive assembly of the belt steering mechanism includes a spur gear mounted to the free end of the steering shaft, a belt steering motor having a rotatable output shaft and a pinion gear mounted on the output shaft of the belt steering motor. The pinion gear meshes with the spur gear, such that, rotation of the belt steering motor output shaft causes rotation of the steering shaft and pivotal movement of the steering carriage about the steering axis.

The different embodiments of the belt steering mechanism form part of a system for registration of a latent image on the photoconductor belt of a multi-color electrophotographic imaging system. This registration system includes a detection mechanism and a belt steering controller that connects the detection mechanism to the belt steering motor of the belt steering drive assembly. The detection mechanism detects deviation of the photoconductor belt from the continuous transport path, and generates a deviation signal representative of this deviation. The belt steering controller controls the belt steering motor of the belt steering drive assembly based upon the deviation signal to pivotally move the steering carriage, and the steering roller therewith, about the steering axis to move the photoconductor belt in the second direction, substantially perpendicular to the continuous transport path, so as to reduce the deviation of the photoconductor belt from the continuous transport path.

By correcting the deviation of the photoconductor belt from its continuous transport path, the belt steering mechanism of the present invention, significantly improves image quality of the final multi-color image on the output media, by substantially eliminating visible artifact producing misregistration between different scan lines and different latent images. In addition, the belt steering mechanism of the present invention provides these features, while being of a reliable, non-complex design so as to be relatively easy and inexpensive to manufacture.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principals of the invention. Other embodiments of the present invention and many of the intended advantages of the present invention will be readily appreciated as the same become better understood by reference to the following detailed description when considered in connection with the accompanying drawings, in which like reference numerals designate like parts throughout the figures thereof, and wherein.

DETAILED DESCRIPTION OF THE PREFERRED EMBODIMENTS

Figure 1:
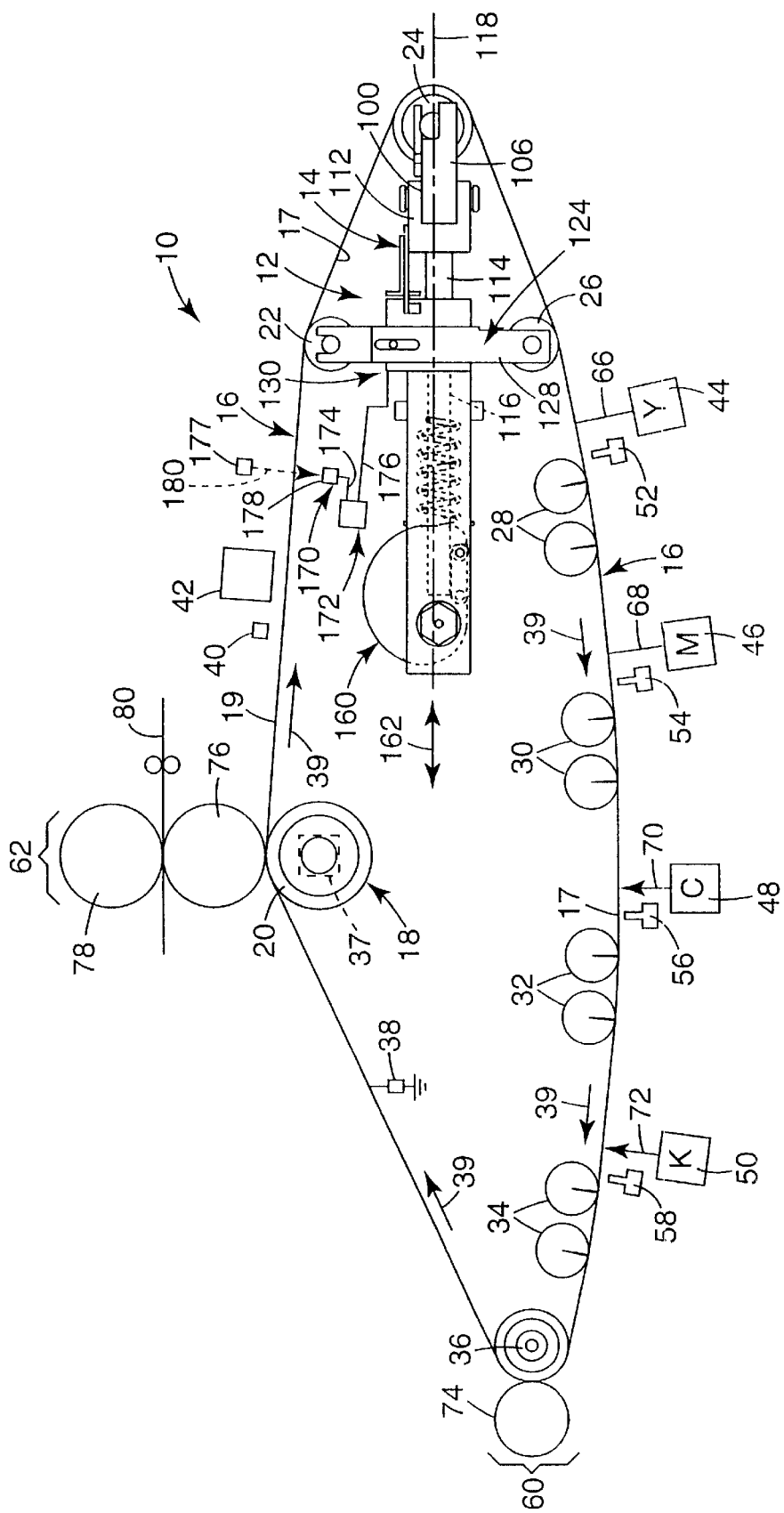
FIG. 1 is a side elevational view illustrating an exemplary multi-color electrophotographic imaging system having a photoconductor belt registration system employing a first preferred embodiment of a belt steering mechanism in accordance with the present invention.

FIG. 1 generally illustrates an exemplary embodiment of a multi-color electrophotographic imaging system 10 having a registration system 12 employing a first preferred belt steering mechanism embodiment 14 in accordance with the present invention. The electrophotographic imaging system 10 includes an endless (i.e., continuous) photoconductor belt 16 mounted about a support roller mechanism 18. The support roller mechanism 18 is defined by a plurality of rollers 20, 22, 24, 26, 28, 30, 32, 34 and 36. The endless photoconductor belt 16 has an inner surface 17 that is in contact with the rollers 20, 22, 24, 26, 28, 30, 32, 34 and 36, and an outer surface 19 having an organic photoreceptor coating thereon. The shaft of the roller 36 is coupled, in a known manner, to a drive system, such as a motor 37, either directly or via any of a variety of drive transmission devices. The motor 37 drives the roller 36 which frictionally drives the photoconductor belt 16 to move about the rollers 20, 22, 24, 26, 28, 30, 32, 34 and 36 in a continuous transport path in the direction indicated by arrows 39. Although FIG. 1 illustrates roller 36 as being driven by the motor 37, alternatively, the motor 37 could be coupled to any of the other rollers 20, 22, 24, 26, 28, 30, 32 and 34. The electrophotographic imaging system 10 further includes a grounding brush 38, an erase station 40, a charging station 42, a plurality of scanners 44, 46, 48, 50, a plurality of development stations 52, 54, 56, 58, a drying station 60, and a transfer station 62. The imaging system 10 forms a multicolor image in a single pass of photoconductor belt 16 around a continuous transport path. An imaging system capable of assembling a multi-color image in a single pass of a photoconductor belt is disclosed, for example, in co-pending and commonly assigned U.S. patent application Ser. No. 08/537,296 to Kellie et al., filed Sep. 29, 1995, and entitled "METHOD AND APPARATUS FOR PRODUCING A MULTI-COLORED IMAGE IN AN ELECTROPHOTOGRAPHIC SYSTEM". The entire content of the above-referenced patent application is incorporated herein by reference. Optionally, the electrophotographic imaging system 10 may be a multi-pass electrophotographic imaging system.

In operation of electrophotographic imaging system 10, the photoconductor belt 16 is driven to travel in a first direction indicated by the arrows 39 along a desired, centered, continuous transport path. As photoconductor belt 16 moves along the transport path, erase station 40 uniformly discharges any charge remaining on the photoconductor belt 16 from a previous imaging operation. Grounding brush 38 mechanically couples the ground plane of photoconductor belt 16 to ground potential. As known in the art, in a dark environment, photoconductor belt 16 is an electrical insulator. When exposed to light by erase station 40 at a correct wavelength, photoconductor belt 16 becomes partially conductive such that charge remaining on photoconductor belt 16 may be discharged to ground through grounding brush 38.

Photoconductor belt 16 then encounters charging station 42, which uniformly charges the belt 16 to a predetermined level. The scanners 44, 46, 48, 50 selectively discharge an imaging region of photoconductor belt 16 with laser beams 66, 68, 70, 72, respectively, to form latent electrostatic images. Each latent image is representative of one of a plurality of color separation images.

As shown in FIG. 1, each development station 52, 54, 56, 58 is disposed after one of scanners 44, 46, 48, 50, respectively, relative to the direction 39 of movement of photoconductor belt 16. Each of the development stations 52, 54, 56, 58 applies a developer having a color appropriate for the color separation image represented by the particular latent image formed by the preceding scanner 44, 46, 48, 50. In the example of FIG. 1, development stations 52, 54, 56, 58 apply yellow (Y), magenta (M), cyan (C), and black developers (K), respectively, to photoconductor belt 16. A suitable developer is disclosed, for example, in commonly assigned U.S. Pat. No. 5,652,282 (issued Jul. 29, 1997, to Baker et al.) entitled "LIQUID INK USING A GEL ORGANOSOL". The entire content of the above-referenced patent is incorporated herein by reference.

As the photoconductor belt 16 moves in the direction 39, scanner 44 forms a latent image in an imaging region of the photoconductor belt 16. This latent image is developed by the development station 52. As photoconductor belt 16 continues to move in the direction 39, the next scanner 46, 48, 50 begins to form a latent image in the same imaging region of the photoconductor belt 16 in registration with the latent image formed by the preceding scanner 44 and developed by the preceding development station 52. Thus, the color separation images are formed in registration on top of one another in the same imaging region. The scanners 44, 46, 48, 50 and development stations 52, 54, 56, 58 may be spaced such that an entire latent image is formed and developed prior to formation and development of the next latent image. For increased speed and reduced size, each scanner 46, 48, 50 and development station 54, 56, 58 preferably begins formation and development of the next latent image prior to complete formation and development of the preceding latent image.

After scanners 44, 46, 48, 50 and development stations 52, 54, 56, 58 have formed and developed the latent images, the imaging region of the moving photoconductor belt 16 encounters drying station 60. The drying station 60 may include a heated roller 74 that forms a nip with belt roller 36. The heated roller 74 applies heat to photoconductor belt 16 to dry the developed image applied by development stations 52, 54, 56, 58. The imaging region of photoconductor belt 16 next arrives at transfer station 62. The transfer station 62 includes an intermediate transfer roller 76 that forms a nip with photoconductor belt 16 over belt roller 20 and a pressure roller 78 that forms a nip with the intermediate transfer roller 76. The developed image on photoconductor belt 16 transfers from the photoconductor belt surface to intermediate transfer roller 76 by selective adhesion. The pressure roller 78 serves to transfer the image on intermediate transfer roller 76 to an output substrate 80 by application of pressure and/or heat to the output substrate 80. The output substrate 80 may comprise, for example, paper or film.

Figure 2:
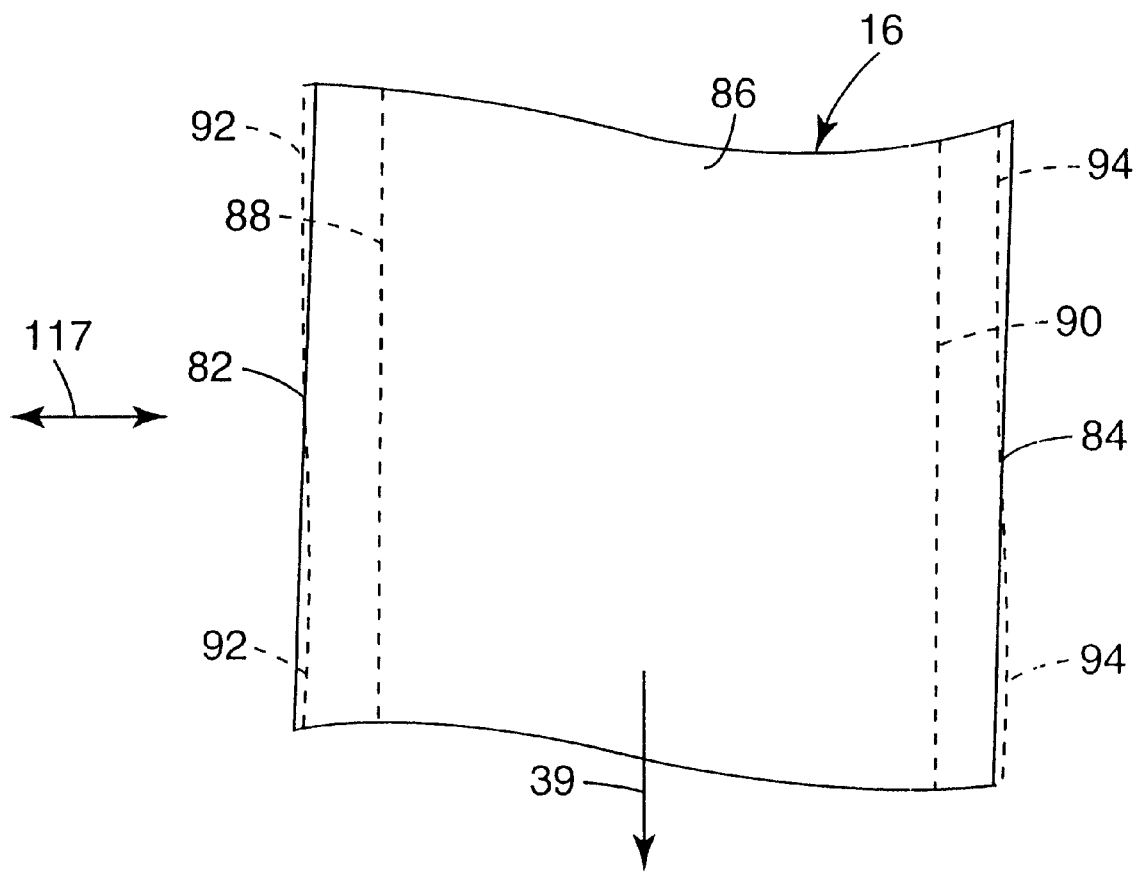
FIG. 2 is top plan view of an exemplary continuous belt used in the electrophotographic imaging system of FIG. 1.

FIG. 2 is a top plan view of an exemplary photoconductor belt 16 for use in the electrophotographic imaging system 10 of FIG. 1. As shown in FIG. 2, the photoconductor belt 16 includes a left belt edge 82 and a right belt edge 84. The photoconductor belt 16 also includes an imaging region 86. The imaging region 86 includes a left margin 88 positioned at a fixed distance relative to left belt edge 82, and a right margin 90 positioned at a fixed distance relative to right belt edge 84. The left and right margins 88 and 90 define the width of the imaging region 86 extending in a direction perpendicular to the direction 39 of movement (i.e., also known as the "down-web" direction of movement) of the photoconductor belt 16. The imaging region 86 also has a length defined by top and bottom margins (not shown) in FIG. 2.

Each scanner 44, 46, 48, 50 is oriented to scan the respective laser beam 66, 68, 70, 72 across the width of the imaging region 86 in a scan line. Movement of the photoconductor belt 16 in direction 39 relative to each scanner 44, 46, 48, 50 produces a plurality of scan lines on the belt 16. The laser beam is modulated based on image data representative of the latent image such that each of the scan lines includes an image scan segment. The image scan segments ideally extend between the left and a right margins 88 and 90 and together form a latent image in the imaging region 86. The left and right belt edges 82 and 84 ideally extend parallel to the direction 39 of movement of the photoconductor belt 16. As indicated by dashed lines 92 and 94, however, photoconductor belt 16 can move from side-to-side during travel in direction 39, deviating slightly from a desired, centered, continuous transport path.

To produce a high quality image, the latent images formed by the scanners 44, 46, 48, 50 must be formed in precise registration with one another in the imaging region 86. Precise registration can be difficult due to the side-to-side movement of photoconductor belt 16 during travel in direction 39. Left and right margins 88 and 90 of imaging region 86 are fixed relative to the left and right edges 82 and 84 respectively, of photoconductor belt 16. In addition, the scan lines and the image scan segments of the scanners 44, 46, 48, 50 are fixed relative to a start-of-scan coordinate. The side-to-side movement of photoconductor belt 16 can cause movement of imaging region 86 relative to the start-of-scan coordinate. As a result, misregistration can occur between the different scan lines and between different latent images. This misregistration can significantly degrade image quality. In particular, this misregistration can produce visible artifacts in the ultimate multi-color image upon transfer of the misregistered color separation images to the output substrate 80.

In accordance with the present invention, there is provided a belt steering mechanism 14 that forms part of the registration system 12 for registration of color separation images on the photoconductor belt 16. As seen best in FIGS. 1, 3 and 4, the first preferred belt steering mechanism embodiment 14 includes the roller 24, referred to as a steering roller, which is rotatably supported on a pivotable steering carriage 100. The pivotable steering carriage 100 includes a first steering carriage mount 102 at a first end 104 of the steering carriage 100, and a second steering carriage mount 106 at an opposite second end 108 of the steering carriage 100. Each of the steering carriage mounts 102 and 106 retains one end of the shaft of the steering roller 24, such that the steering roller is freely rotatable about a longitudinal axis 110 relative to the steering carriage 100. The steering carriage 100 is mounted in a fixed manner to a first end 112 of a steering shaft 114. The steering shaft 114 has a free second end 116 opposite the first end 112. The steering shaft 114 is mounted at its first end 112 to a midpoint of the steering carriage 100.

The steering carriage 100 moves the photoconductor belt 16 in a direction, illustrated by arrow 117 (see FIG. 2), perpendicular to the continuous transport path (represented by arrow 39) by rotation about a steering axis 118 coincident with a longitudinal axis of the steering shaft 114. The steering axis 118 is substantially perpendicular to the longitudinal axis 110 of the steering roller 24. To enable pivotal movement of the steering carriage 100, and the steering roller 24 therewith, about the steering axis 118, the steering shaft 114 is rotatably mounted in a journal bearing 120 in a support plate 122 of a support carriage 124. The position of the support carriage 124 is fixed, therefore, the steering carriage 100 is pivotally movable relative to the support carriage 124 about the steering axis 118. First and second block mounts 126 and 128 are coupled to the support plate 122 of the support carriage 124. The first and second block mounts 126 and 128 retain opposite ends of the shafts associated with the freely rotatable rollers 22 and 26.

The belt steering mechanism 14 functions as a roller adjustment mechanism that adjusts the position of the steering roller 24 to move the photoconductor belt 16 in the direction 117. The steering carriage 100 of the belt steering mechanism 14 may be pivotally moved relative to the support carriage 124 about the steering axis 118 by a variety of different drive mechanisms.

Figure 3:
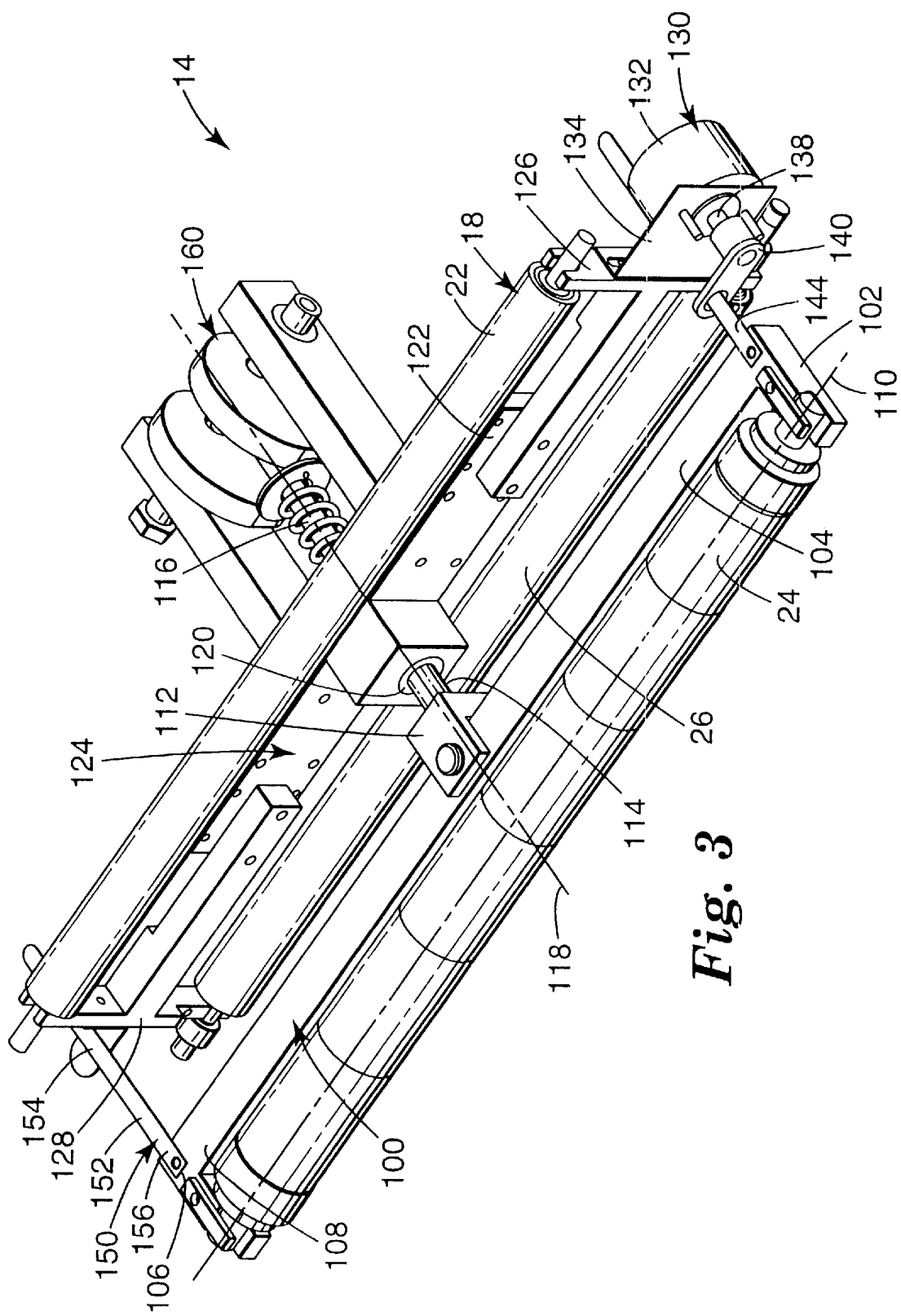
FIG. 3 is a perspective view of the first embodiment of the belt steering mechanism shown in FIG. 1.
Figure 4:
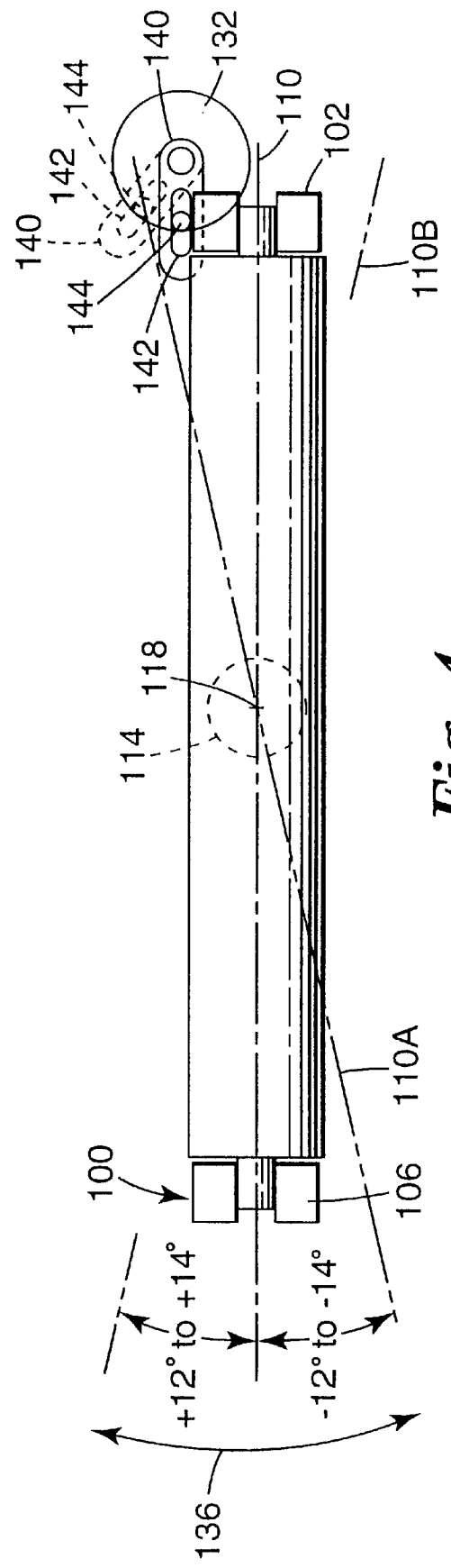
FIG. 4 is a schematic end elevational view partially illustrating the first embodiment of the belt steering mechanism shown in FIG. 3.

As seen best in FIGS. 3 and 4, the belt steering drive assembly 130 of the first preferred belt steering mechanism embodiment 14 includes belt steering motor 132 mounted to the first block mount 126 of the support carriage 124 via a bracket 134. In one preferred embodiment the belt steering motor 132 is a rotational solenoid (i.e., also known as a rotary solenoid). Alternatively, the belt steering motor 132 can be a stepper motor. The belt steering motor 132 is operably connected to the first end 104 of the steering carriage 100 to pivotally move the steering carriage (as represented by arrow 136) about the steering axis 118. The belt steering motor 132 includes a rotatable output shaft 138 and a drive link 140. The drive link 140 is rigidly mounted to the output shaft 138. In the first preferred belt steering mechanism embodiment 14, the drive link 140 has a longitudinally extending slot 142 that movably receives a drive pin 144 mounted to the first end 104 of the steering carriage 100. As seen best in FIG. 4, the drive pin 144 engages the longitudinally extending slot 142 of the drive link 140, such that, upon operation of the belt steering motor 132, the steering carriage 100 (and the steering roller 24 therewith) is pivotally moved about the steering axis 118. As stated previously, pivotal movement of the steering carriage 100 causes movement of the photoconductor belt 16 in the directions 117 substantially perpendicular to the direction 39 of the continuous transport path of the photoconductor belt 16. This perpendicular movement of the photoconductor belt 16 in the directions 117 reduces deviation of the belt 16 from the desired, centered, continuous transport path of the photoconductor belt 16.

As seen in solid lines in FIG. 4, the steering carriage 100 has a centered position, wherein the longitudinally extending slot 142 of the drive link 140 is substantially parallel to the longitudinal axis 110 (solid line) of the steering roller 24. The belt steering motor 132 moves the steering carriage 100 within a range of between ±12° to ±14° in both directions relative to this centered position. The dashed longitudinal axis 110A coincides with the dashed representation of the drive link 140, longitudinally extending slot 142 and drive pin 144. The representation of the drive link 140, longitudinally extending slot 142 and drive pin 144 coinciding with the partial dashed line 110B is omitted for clarity, but it is to be understood that the steering carriage 100 can pivot about the steering axis 118 in equal increments in either direction relative to the centered position of the steering carriage 100.

As seen best in FIG. 3, to help restore the steering carriage 100 to its centered position, the belt steering mechanism 100 may preferably include a resistance mechanism 150, operably connected between the steering carriage 100 and the support carriage 124, for resisting pivotal movement of the steering carriage about the steering axis 118. However, the belt steering mechanism 14 will operate properly without aid of the resistance mechanism 150. The resistance mechanism 150 includes a resilient member, such as a flat spring 152, connected at a first end 154 to the second block mount 128 of the support carriage 124, and at a second end 156 to the second end 108 of steering carriage 100. The flat spring 152 exerts a biasing force that tends to bias the steering carriage 100 to its centered position.

Another suitable resistance mechanism is disclosed, for example, in commonly assigned U.S. Pat. No. 5,659,851 (issued Aug. 19, 1997, to Moe et al.) entitled "APPARATUS AND METHOD FOR STEERING AN ENDLESS BELT". The entire content of the above-referenced patent is incorporated herein by reference.

As seen in FIGS. 1 and 3, the belt steering mechanism further includes a belt tensioning mechanism 160 for tensioning the photoconductor belt 16 about the support roller mechanism 18. The belt tensioning mechanism 160 moves the steering carriage 100 longitudinally along the steering axis 118 as shown by directional arrow 162 in FIG. 1, to tension and de-tension the photoconductor belt 16. A suitable belt tensioning mechanism is disclosed, for example, in aforementioned, commonly assigned U.S. Pat. No. 5,659,851 (issued Aug. 19, 1997, to Moe et al.) entitled "APPARATUS AND METHOD FOR STEERING AN ENDLESS BELT".

As stated previously, the belt steering mechanism 14 of the present invention forms part of the registration system 12 for registration of color separation images on the photoconductor belt 16. As seen in FIG. 1, the registration system 12 includes a belt position detection mechanism 170 and a belt steering controller 172. The belt steering controller 172 is coupled to the detection mechanism 170 via a communication line 174 and to the belt steering motor 132 of the belt steering drive assembly 130 via a communication line 176. The belt position detection mechanism 170 works in conjunction with a light source 177 for detecting deviation of the photoconductor belt 16 from its desired, centered continuous transport path. In one preferred embodiment, the detection mechanism 170 is a photodetector 178. In operation, the light source 177 is disposed adjacent the left edge 82 of photoconductor belt 16, and is in optical alignment with photodetector 178. Hence, in the exemplary embodiment, the belt position detection mechanism 170 is a belt edge detection mechanism. The light source 177 produces a light beam 180 that is incident upon the photodetector 178 and the photoconductor belt 16. The photodetector 178 generates a belt edge detection signal when light beam 180 from the light source 177 is detected. The photodetector 178 provides a belt edge deviation signal which is representative of the position of the left edge 82 of photoconductor belt 16, and specifically, is representative of the amount of deviation of photoconductor belt 16 from its desired, centered, continuous transport path.

As photoconductor belt 16 deviates from its continuous transport path, the belt walking of photoconductor belt 16 during travel must be corrected for precise belt registration and registration of the latent images on photoconductor belt 16. As such, belt position detection mechanism 170 detects lateral movement of photoconductor belt 16 relative to the continuous transport path, and provides the deviation signal to the belt steering controller 172 via line 174.

The belt steering controller 172 is a microprocessor that takes the deviation signal from the detection mechanism 170 and provides a control signal, via line 176, to the belt steering motor 132 of the belt steering drive assembly 130 for activation/deactivation of the belt steering motor 132 to pivotally move the steering carriage 100 about the steering axis 118 to move the belt in directions 117 and reduce the deviation of the photoconductor belt 16 from the continuous transport path. The belt steering controller 172 controls the belt steering motor 132 of the belt steering mechanism 14 based on the deviation signals generated by the belt position detection mechanism 170, and more specifically, based on the belt position deviation signal generated by photodetector 178. In this manner, the belt steering controller 172 reduces significant deviation that can lead to misregistration of the latent images formed by scanners 44, 46, 48, 50 on photoconductor belt 16. The belt steering controller 172 may be configured to energize the belt steering motor 132 based on the deviation signal for a period of time sufficient for photoconductor belt 16 to walk along the steering roller 24 to the appropriate lateral position in the continuous transport path. The period of time can be determined based on the position information provided by the belt position deviation signal and knowledge of the rate of movement characteristics of photoconductor belt 16 along steering roller 24. The belt steering controller 172 also could be configured to energize the belt steering motor 132 for a period of time until the belt edge deviation signal indicates that the position of the belt edge has returned to the proper position.

A suitable belt position detection mechanism and belt steering controller is disclosed, for example, in commonly assigned U.S. patent application Ser. No. 09/157,633 to Ender et al. filed Sep. 21, 1998 entitled "COMBINATION ERASE BAR AND BELT POSITION DETECTOR SYSTEM FOR USE WITH AN ELECTROPHOTOGRAPHIC IMAGING SYSTEM". The entire content of the above-referenced patent application are incorporated herein by reference.

Figure 5:
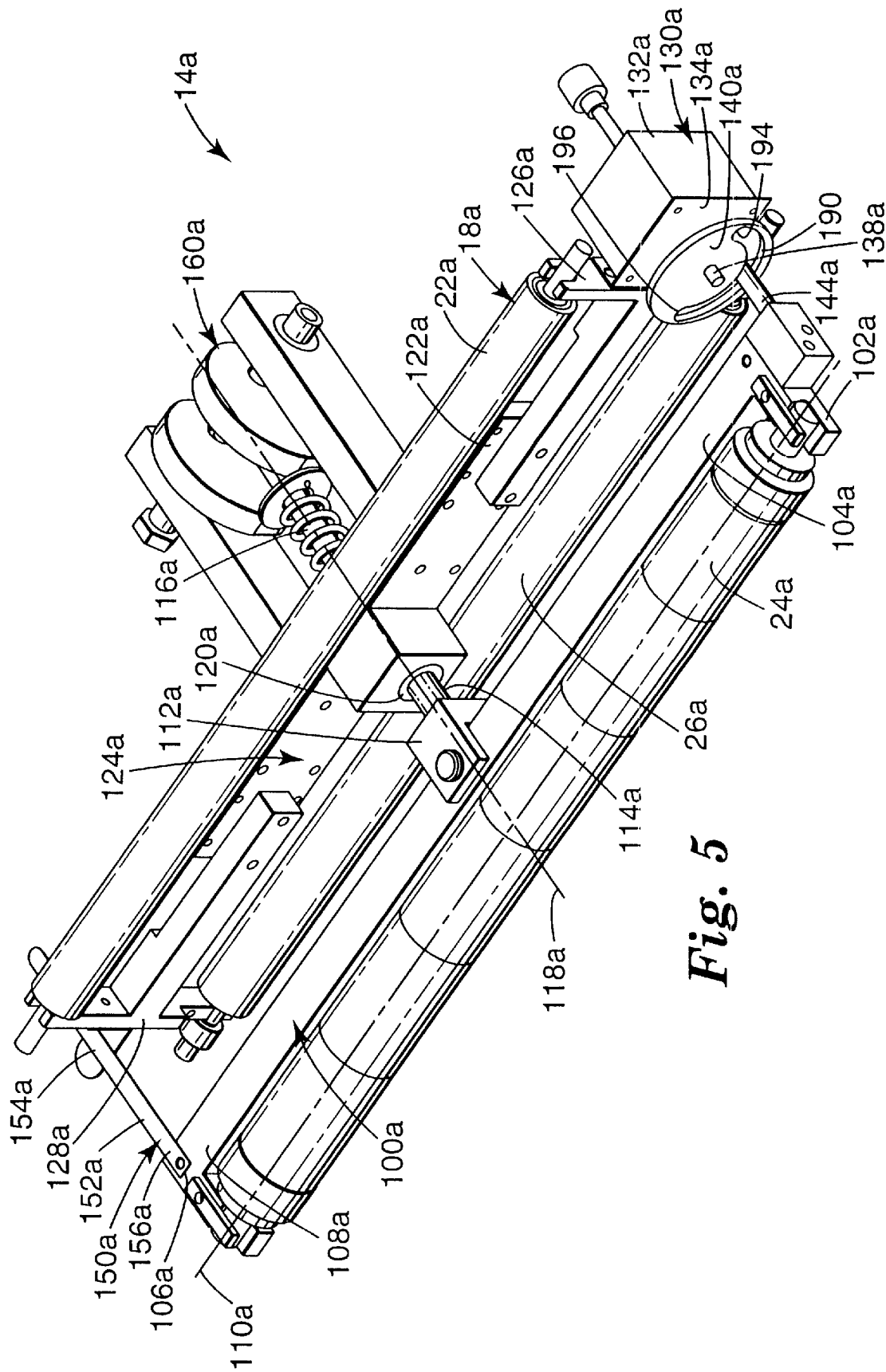
FIG. 5 is a perspective view of a second embodiment of the belt steering mechanism in accordance with the present invention.
Figure 6:
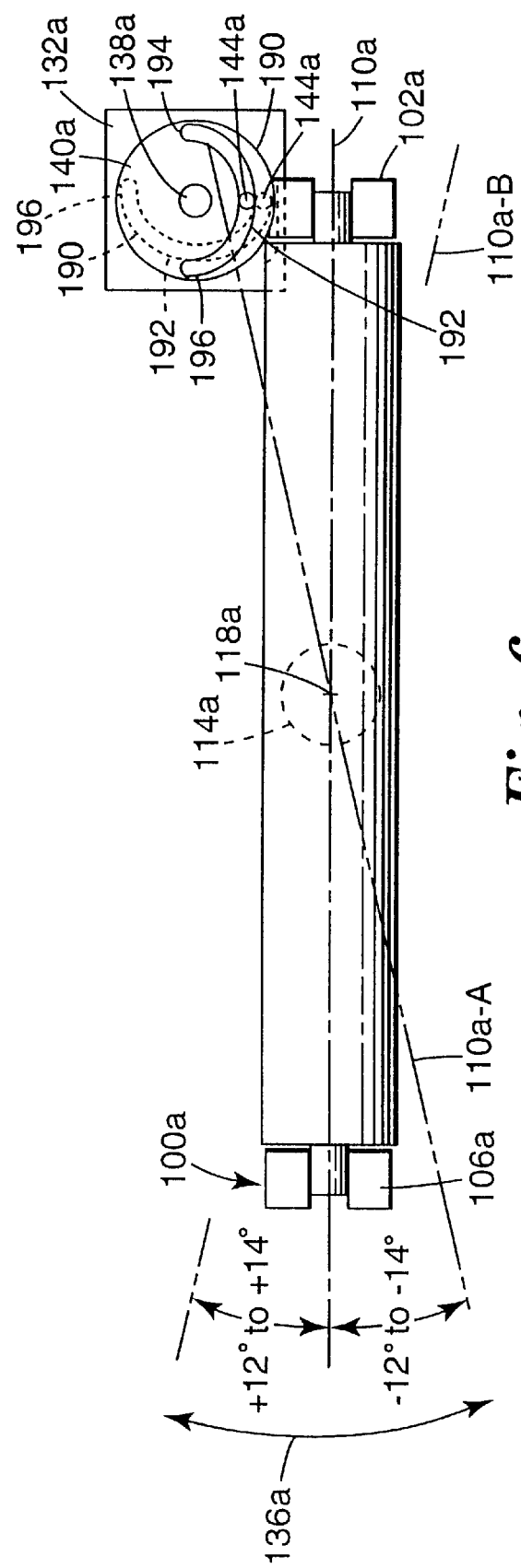
FIG. 6 is a schematic end elevational view partially illustrating the second embodiment of the belt steering mechanism shown in FIG. 5.

FIGS. 5 and 6, illustrate a second belt steering mechanism embodiment 14a. Like to parts are labeled with like numerals except for the addition of the subscript "a". The second belt steering mechanism embodiment 14a operates in the same way as the first preferred belt steering mechanism embodiment 14 except, in the second belt steering mechanism embodiment 14a the drive pin 144a is movably received within a curved slot 190 (having a non-constant radius of curvature) of the drive link 140a. The curved slot 190 of the drive link 140a has a midpoint 192, a first end 194 and a second end 196. As seen best in FIG. 6, the radius of curvature of the curved slot constantly increases from the midpoint 192 to the first end 194, and from the midpoint 192 to the second end 196. The constantly increasing radius of curvature from the midpoint 192 to the first end 194 of the curved slot 190 is substantially equal to the constantly increasing radius of curvature from the midpoint 192 to the second end 196 of the curved slot 190. As seen in solid lines in FIG. 6, the steering carriage 100a has a centered position, wherein the drive pin 144a is at the midpoint 192 of the curved slot 190 in the drive link 140a. The belt steering motor 132a moves the steering carriage 100a within a range of between ±12° to ±14° in both directions relative to this centered position. The dashed longitudinal axis 110a-A coincides with the dashed representation of the curved slot 190 and the drive pin 144a. The representation of the drive link 140a and curved slot 190 coinciding with the partial dashed line 110a-B is omitted for clarity, but it is to be understood that the steering carriage 100a can pivot about the steering axis 118a in equal increments in either direction relative to the centered position of the steering carriage 100a. Rotation of the output shaft 138a, upon operation of the belt steering motor 132a, causes pivotal movement of the steering carriage 100a about the steering axis 118a to reduce deviation of the photoconductor belt 16 from the continuous transport path.

Figure 7:
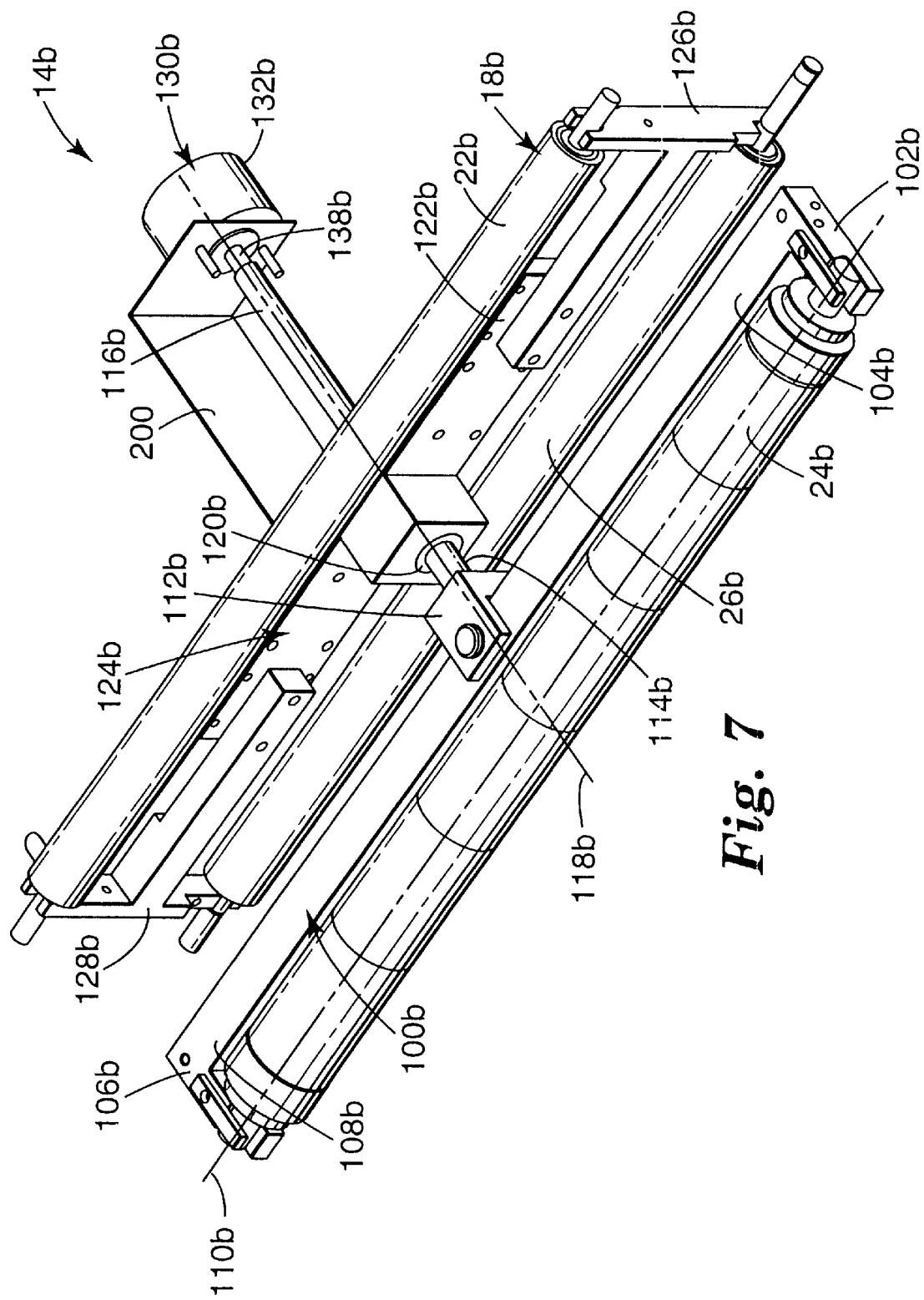
FIG. 7 is a perspective view of a third embodiment of the belt steering mechanism in accordance with the present invention.

FIG. 7, illustrates a third belt steering mechanism embodiment 14b. Like parts are labeled with like numerals except for the addition of the subscript "b". The third belt steering mechanism embodiment 14b operates in a similar fashion to the first preferred belt steering mechanism embodiment 14 except, in the third belt steering mechanism embodiment 14b, the resistance mechanism 150 and the belt tensioning mechanism 160 have been eliminated; and the belt steering motor 132b is mounted to a bracket 200 to the rear of and at the midpoint of the support carriage 124b. In this third belt steering mechanism embodiment 14b the rotatable output shaft 138b of the belt steering motor 132b is directly connected to the second end 116b of the steering shaft 114b. Rotation of the output shaft 138b, upon operation of the belt steering motor 132b, causes rotation of the steering shaft 114b and pivotal movement of the steering carriage 100b about the steering axis 118b to reduce deviation of the photoconductor belt 16 from the continuous transport path.

Figure 8:
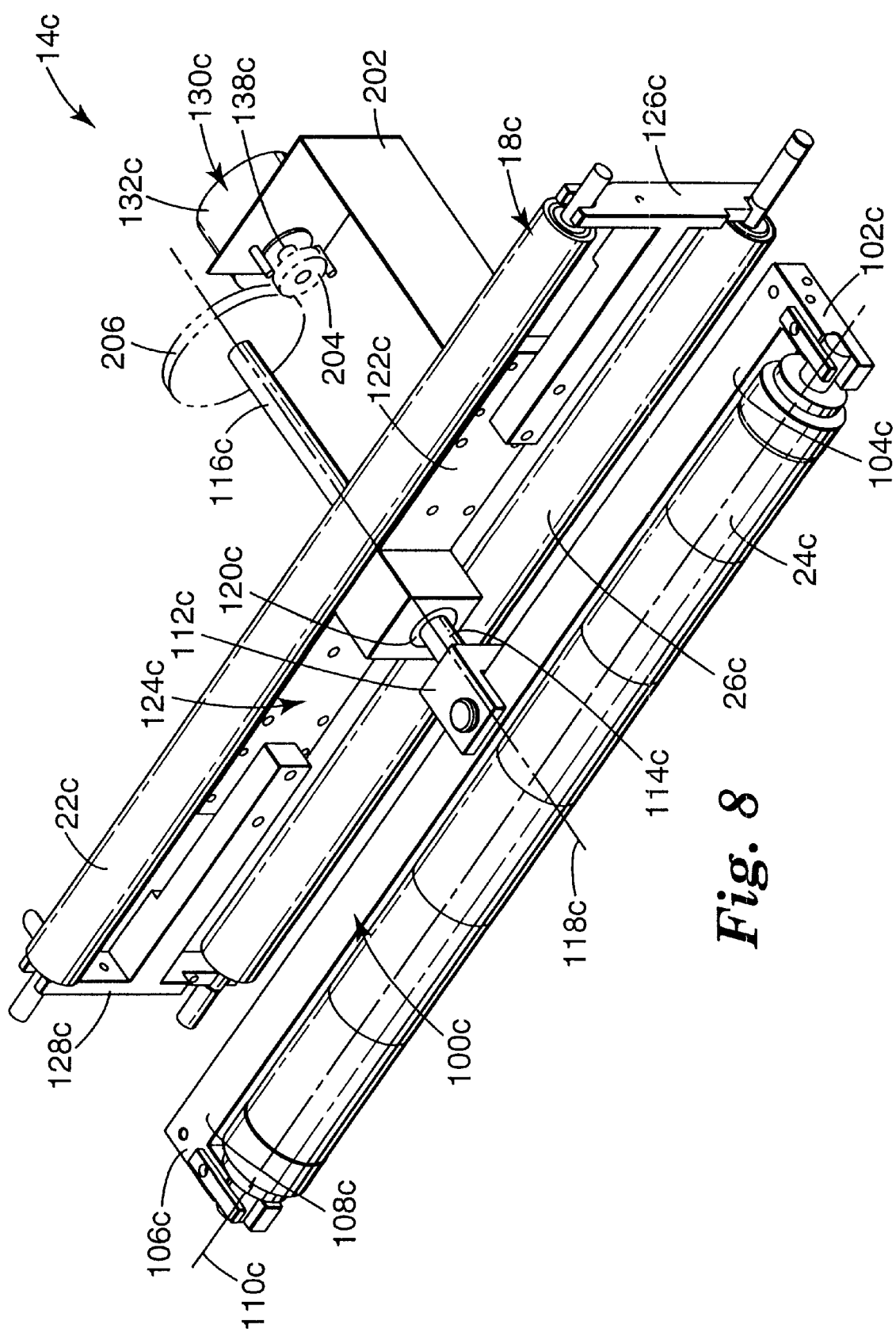
FIG. 8 is a perspective view of a fourth embodiment of the belt steering mechanism in accordance with the present invention.

FIG. 8, illustrates a fourth belt steering mechanism embodiment 14c. Like parts are labeled with like numerals except for the addition of the subscript "c". The fourth belt steering mechanism embodiment 14c operates in a similar fashion to the first preferred belt steering mechanism embodiment 14 except, in the fourth belt steering mechanism embodiment 14c, the resistance mechanism 150 and the belt tensioning mechanism 160 have been eliminated; and the belt steering motor 132c is mounted to a bracket 202 to the rear of and to one side of the midpoint of the support carriage 124c. In this fourth belt steering mechanism embodiment 14c the rotatable output shaft 138c of the belt steering motor 132c includes a pinion gear 204 that meshes with a spur gear 206 mounted to the second end 116c of the steering shaft 114c. Rotation of the output shaft 138c, upon operation of the belt steering motor 132c, causes rotation of the steering shaft 114c and pivotal movement of the steering carriage 100c about the steering axis 118c to reduce deviation of the photoconductor belt 16 from the continuous transport path. Alternatively, the spur gear 206 could be replaced by a gear reduction mechanism that limits movement but increases torque.

As stated previously, the electrophotographic imaging system 10 of FIG. 1 is a four color (i.e., multi-color) electrophotographic imaging system. However, the belt steering mechanism 14, 14a, 14b and 14c of the present invention can be readily applied to provide registration of any number of one or more latent images on a photoconductor belt 16. In addition, although the imaging system 10 is shown as a multi-color/single pass system in FIG. 1 the belt steering mechanism 14, 14a, 14b and 14c of the present invention can be readily applied to multi-pass electrophotographic imaging systems requiring common registration of color separation images on a photoconductor belt 16. In a multi-pass imaging, side-to-side movement of the photoconductor belt 16 may be somewhat periodic. Thus, misregistration between consecutive latent images may be more predictable than in a single pass system. Nevertheless, the belt steering mechanism 14, 14a, 14b and 14c in accordance with the present invention is useful in a multi-pass system to improve image quality.

In summary, by correcting the deviation of the photoconductor belt 16 from its continuous transport path, the belt steering mechanism 14, 14a, 14b and 14c of the present invention, significantly improves image quality of the final multi-color image on the output substrate 80, by substantially eliminating visible artifact producing misregistration between different scan lines and different latent images. In addition, the belt steering mechanism 14, 14a, 14b and 14c of the present invention provides these features, while being of a reliable, non-complex design so as to be relatively easy and inexpensive to manufacture.

Although the present invention has been described with reference to preferred embodiments, workers skilled in the art will recognize that changes may be made in form and detail without departing from the spirit and scope of the invention.

What is claimed is:

1. A mechanism for steering a photoconductor belt in an electrophotographic imaging system, the photoconductor belt having an inner surface and being moved in a first direction forming a continuous transport path about a support roller mechanism of the imaging system, the photoconductor belt tending to deviate from the continuous transport path in a second direction substantially perpendicular to the continuous transport path, the photoconductor belt steering mechanism comprising:

a support carriage;
a steering carriage pivotally mounted to the support carriage about a steering axis, the steering carriage having a first end and an opposite second end;
a mechanism operably connected to the steering carriage for resisting pivotal movement of the steering carriage about the steering axis;
a steering roller mounted to the steering carriage so as to be pivotable therewith about the steering axis, the steering roller contacting the inner surface of the photoconductor belt and having a longitudinal axis substantially perpendicular to the steering axis; and
a belt steering drive assembly operably coupled to the first end of the steering carriage for pivotally moving the steering carriage about the steering axis, such that, upon pivotal movement of the steering carriage about the steering axis, the steering roller pivots therewith to move the photoconductor belt in the second direction to reduce deviation of the photoconductor belt from the continuous transport path.

2. The belt steering mechanism of claim 1 wherein the mechanism for resisting pivotal movement of the steering carriage is a resilient member that exerts a force tending to bias the steering carriage to a centered position.

3. The belt steering mechanism of claim 2 wherein the resilient member is a flat spring connected at a first end to the support carriage, and at a second end to the steering carriage.

4. The belt steering mechanism of claim 3 wherein the second end of the flat spring is connected to the second end of the steering carriage.

5. A mechanism for steering a photoconductor belt in an electrophotographic imaging system, the photoconductor belt having an inner surface and being moved in a first direction forming a continuous transport path about a support roller mechanism of the imaging system, the photoconductor belt tending to deviate from the continuous transport path in a second direction substantially perpendicular to the continuous transport path, the photoconductor belt steering mechanism comprising:

a support carriage;
a steering carriage pivotally mounted to the support carriage about a steering axis, the steering carriage having a first end and an opposite second end;
a steering roller mounted to the steering carriage so as to be pivotable therewith about the steering axis, the steering roller contacting the inner surface of the photoconductor belt and having a longitudinal axis substantially perpendicular to the steering axis; and
a belt steering drive assembly operably coupled to the first end of the steering carriage for pivotally moving the steering carriage about the steering axis, such that, upon pivotal movement of the steering carriage about the steering axis, the steering roller pivots therewith to move the photoconductor belt in the second direction to reduce deviation of the photoconductor belt from the continuous transport path; and wherein the steering carriage has a centered position, and the belt steering drive assembly pivotally moves the steering carriage within a range of between ±12° to ±14° of the centered position.

6. A mechanism for steering a photoconductor belt in an electrophotographic imaging system, the photoconductor belt having an inner surface and being moved in a first direction forming a continuous transport path about a support roller mechanism of the imaging system, the photoconductor belt tending to deviate from the continuous transport path in a second direction substantially perpendicular to the continuous transport path, the photoconductor belt steering mechanism comprising:

a support carriage;

a steering carriage pivotally mounted to the support carriage about a steering axis, the steering carriage having a first end and an opposite second end;

a mechanism operably connected to the steering carriage for resisting pivotal movement of the steering carriage about the steering axis;

a steering roller mounted to the steering carriage so as to be pivotable therewith about the steering axis, the steering roller contacting the inner surface of the photoconductor belt and having a longitudinal axis substantially perpendicular to the steering axis; and a belt steering drive assembly operably coupled to the first end of the steering carriage for pivotally moving the steering carriage about the steering axis, such that, upon pivotal movement of the steering carriage about the steering axis, the steering roller pivots therewith to move the photoconductor belt in the second direction to reduce deviation of the photoconductor belt from the continuous transport path, the belt steering drive assembly including:

a belt steering motor having a rotatable output shaft;

a drive link mounted to the output shaft of the belt steering motor, the drive link having a opening; and a drive pin mounted to the first end of the steering carriage, the drive pin engaging the opening of the drive link such that upon operation of the belt steering motor, the steering carriage is pivotally moved about the steering axis via interengagement of the drive link with the drive pin.

7. The belt steering mechanism of claim 6 wherein the opening within the drive link is a longitudinally extending slot.

8. The belt steering mechanism of claim 7 wherein the steering carriage has a centered position, and wherein the longitudinally extending slot of the drive link is substantially parallel to the longitudinal axis of the steering roller.

9. The belt steering mechanism of claim 6 wherein the opening within the drive link is a curved slot.

10. The belt steering mechanism of claim 9 wherein the curved slot of the drive link is of a non-constant radius of curvature.

11. The belt steering mechanism of claim 10 wherein the curved slot of the drive link has a midpoint, a first end and a second end, and wherein the radius of curvature of the curved slot changes from the midpoint to the first and second ends.

12. The belt steering mechanism of claim 11 wherein the radius of curvature of the curved slot constantly increases from the midpoint to the first and second ends.

13. The belt steering mechanism of claim 12 wherein the constantly increasing radius of curvature from the midpoint to the first end of the curved slot is substantially equal to the constantly increasing radius of curvature from the midpoint to the second end of the curved slot.

14. The belt steering mechanism of claim 6 wherein the belt steering motor is mounted on the support carriage.

15. The belt steering mechanism of claim 6 wherein the belt steering motor is a rotational solenoid.

16. The belt steering mechanism of claim 6 wherein the belt steering motor is a stepper motor.

17. A mechanism for steering a photoconductor belt in an electrophotographic imaging system, the photoconductor belt having an inner surface and being moved in a first direction forming a continuous transport path about a support roller mechanism of the imaging system, the photoconductor belt tending to deviate from the continuous transport path in a second direction substantially perpendicular to the continuous transport path, the photoconductor belt steering mechanism comprising:

a support carriage;

a steering carriage including:

a steering shaft having a steering axis, a first end secured to a midpoint of the steering carriage and a second end, the steering shaft being rotatably mounted to the support carriage such that the steering carriage is pivotally movable about the steering axis relative to the support carriage;

a steering roller mounted to the steering carriage so as to be pivotable therewith about the steering axis, the steering roller contacting the inner surface of the photoconductor belt and having a longitudinal axis substantially perpendicular to the steering axis; and a belt steering drive assembly operably coupled to the second end of the steering shaft for rotating the steering shaft to pivotally move the steering carriage about the steering axis, such that, upon pivotal movement of the steering carriage about the steering axis, the steering roller pivots therewith to move the photoconductor belt in the second direction to reduce deviation of the photoconductor belt from the continuous transport path.

18. The belt steering mechanism of claim 17 wherein the belt steering drive assembly includes:

a belt steering motor having a rotatable output shaft directly coupled to the steering shaft, such that rotation of the belt steering motor output shaft causes rotation of the steering shaft and pivotal movement of the steering carriage about the steering axis.

19. The belt steering mechanism of claim 18 wherein the belt steering motor is mounted on the support carriage.

20. The belt steering mechanism of claim 18 wherein the belt steering motor is a rotational solenoid.

21. The belt steering mechanism of claim 18 wherein the belt steering motor is a stepper motor.

22. The belt steering mechanism of claim 17 wherein the belt steering drive assembly includes:

a spur gear mounted to the second end of the steering shaft;

a belt steering motor having a rotatable output shaft; and a pinion gear mounted on the output shaft of the belt steering motor, the pinion gear meshing with the spur gear, such that rotation of the belt steering motor output shaft causes rotation of the steering shaft and pivotal movement of the steering carriage about the steering axis.

23. The belt steering mechanism of claim 22 wherein the belt steering motor is mounted on the support carriage.

24. The belt steering mechanism of claim 22 wherein the belt steering motor is a rotational solenoid.

25. The belt steering mechanism of claim 22 wherein the belt steering motor is a stepper motor.

26. A system for registration of a latent image on a photoconductor belt, the registration system comprising:

a photoconductor belt mounted about a plurality of rollers;

a drive apparatus for driving the photoconductor belt to move about the rollers in a continuous transport path, wherein the photoconductor belt tends to deviate from the continuous transport path in a direction substantially perpendicular to the continuous transport path; and a belt steering mechanism for reducing deviation of the photoconductor belt from the continuous transport path, the belt steering mechanism including:
 a support carriage;
 a steering carriage pivotally mounted to the support carriage about a steering axis, the steering carriage having a first end and an opposite second end;
 a steering roller mounted to the steering carriage so as to be pivotable therewith about the steering axis, the steering roller contacting the photoconductor belt and having a longitudinal axis substantially perpendicular to the steering axis; and
 a belt steering drive assembly operably coupled to the first end of the steering carriage for pivotally moving the steering carriage about the steering axis;

a detection mechanism for detecting deviation of the photoconductor belt from the continuous transport path, the detection mechanism generating a deviation signal representative of the deviation of the photoconductor belt; and a belt steering controller coupled to the detection mechanism and the belt steering drive assembly for controlling the belt steering drive assembly based upon the deviation signal, to pivotally move the steering carriage and the steering roller therewith about the steering axis, to move the photoconductor belt in the direction substantially perpendicular to the continuous transport path so as to reduce the deviation of the photoconductor belt from the continuous transport path.

27. The registration system of claim 26 wherein the belt steering drive assembly includes:
 a belt steering motor having a rotatable output shaft;
 a drive link mounted to the output shaft of the belt steering motor, the drive link having a opening; and
 a drive pin mounted to the first end of the steering carriage, the drive pin engaging the opening of the drive link such that upon operation of the belt steering motor, the steering carriage is pivotally moved about the steering axis via interengagement of the drive link with the drive pin.

28. The registration system of claim 27 wherein the opening within the drive link is a longitudinally extending slot.

29. The registration system of claim 27 wherein the opening within the drive link is a curved slot.

30. The registration system of claim 29 wherein the curved slot of the drive link is of a non-constant radius of curvature.

31. The registration system of claim 30 wherein the curved slot of the drive link has a midpoint, a first end and a second end, and wherein the radius of curvature of the curved slot constantly increases from the midpoint to the first and second ends.

32. The registration system of claim 31 wherein the constantly increasing radius of curvature from the midpoint to the first end of the curved slot is substantially equal to the constantly increasing radius of curvature from the midpoint to the second end of the curved slot.

33. The belt steering mechanism of claim 27 wherein the belt steering motor is a rotational solenoid.

34. A system for registration of a latent image on a photoconductor belt, the registration system comprising:

a photoconductor belt mounted about a plurality of rollers;

a drive apparatus for driving the photoconductor belt to move about the rollers in a continuous transport path, wherein the photoconductor belt tends to deviate from the continuous transport path in a direction substantially perpendicular to the continuous transport path; and a belt steering mechanism for reducing deviation of the photoconductor belt from the continuous transport path, the belt steering mechanism including:
 a support carriage;
 a steering carriage including:
  a steering shaft having a steering axis, a first end secured to a midpoint of the steering carriage and a second end, the steering shaft being rotatably mounted to the support carriage such that the steering carriage is pivotally movable about the steering axis relative to the support carriage;
 a steering roller mounted to the steering carriage so as to be pivotable therewith about the steering axis, the steering roller contacting the photoconductor belt and having a longitudinal axis substantially perpendicular to the steering axis; and
 a belt steering drive assembly operably coupled to the second end of the steering shaft for pivotally moving the steering carriage about the steering axis;

a detection mechanism for detecting deviation of the photoconductor belt from the continuous transport path, the detection mechanism generating a deviation signal representative of the deviation of the photoconductor belt; and a belt steering controller coupled to the detection mechanism and the belt steering drive assembly for controlling the belt steering drive assembly based upon the deviation signal, to pivotally move the steering carriage and the steering roller therewith about the steering axis, to move the photoconductor belt in the direction substantially perpendicular to the continuous transport path so as to reduce the deviation of the photoconductor belt from the continuous transport path.

35. The registration system of claim 34 wherein the belt steering drive assembly includes:
 a belt steering motor having a rotatable output shaft directly coupled to the steering shaft, such that rotation of the belt steering motor output shaft causes rotation of the steering shaft and pivotal movement of the steering carriage about the steering axis.

36. The registration system of claim 35 wherein the belt steering motor is a rotational solenoid.

37. The registration system of claim 34 wherein the belt steering drive assembly includes:
 a spur gear mounted to the second end of the steering shaft;
 a belt steering motor having a rotatable output shaft; and
 a pinion gear mounted on the output shaft of the belt steering motor, the pinion gear meshing with the spur gear, such that rotation of the belt steering motor output shaft causes rotation of the steering shaft and pivotal movement of the steering carriage about the steering axis.

38. The registration system of claim 37 wherein the belt steering motor is a rotational solenoid.

* * * * *